K. EGGART.
AUTOMATIC EMBROIDERING MACHINE.
APPLICATION FILED JUNE 19, 1911.
1,128,962.
Patented Feb. 16, 1915.
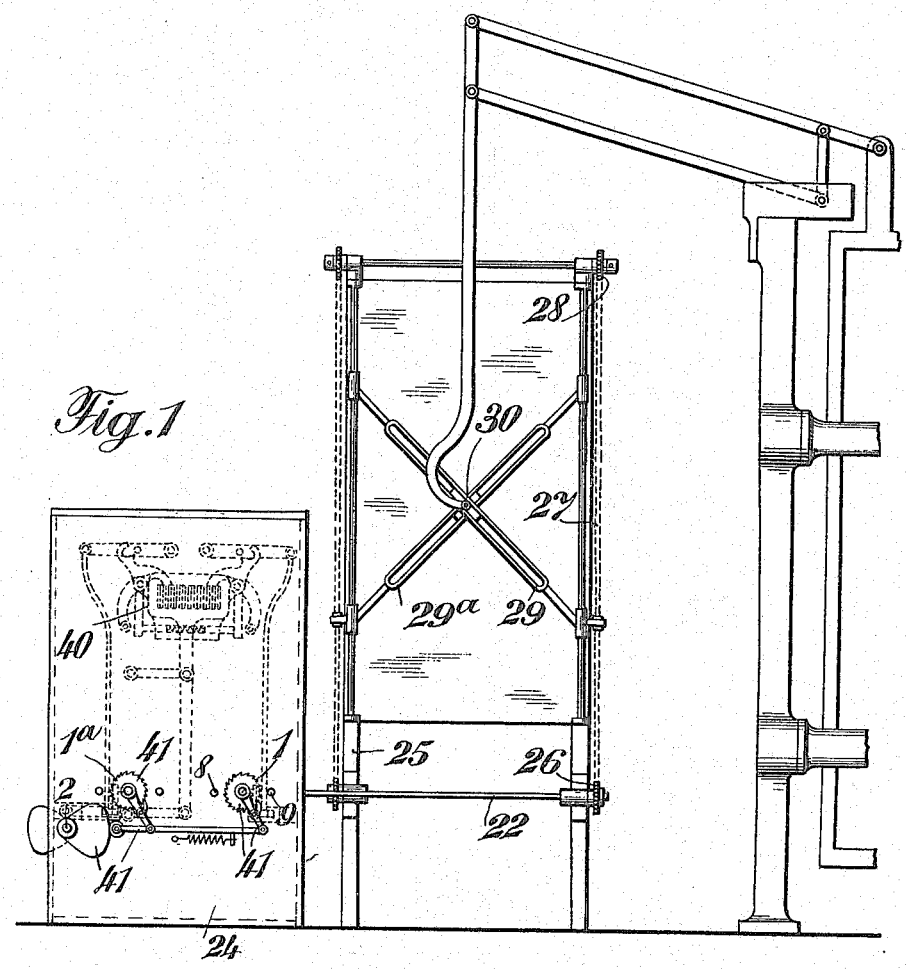
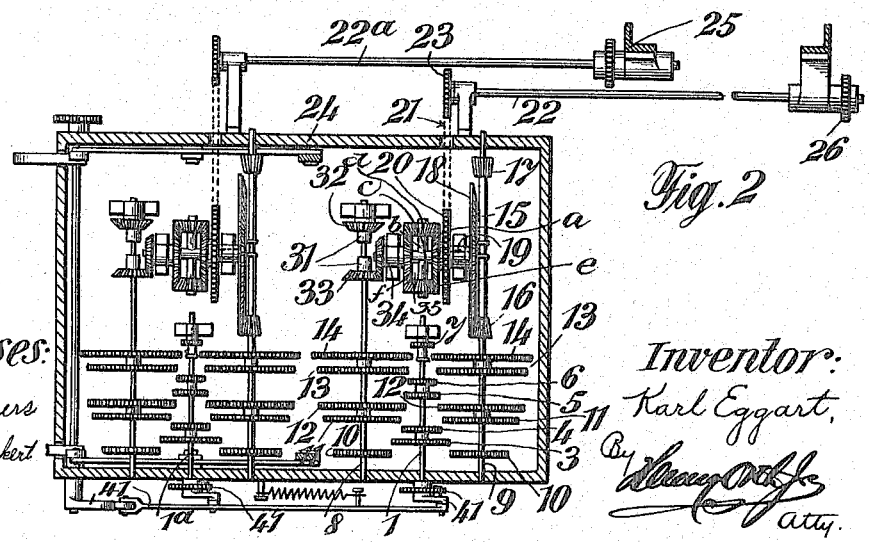

UNITED STATES PATENT OFFICE.

KARL EGGART, OF ARBON, SWITZERLAND, ASSIGNOR TO THE FIRM OF ADOLPH SAURER, OF ARBON, SWITZERLAND.

AUTOMATIC EMBROIDERING-MACHINE.

1,128,962.  Specification of Letters Patent.  Patented Feb. 16, 1915.

Application filed June 19, 1911. Serial No. 633,959.

*To all whom it may concern:*

Be it known that I, KARL EGGART, a subject of the Emperor of Germany, residing at Arbon, Switzerland, have invented new and useful Improvements in Automatic Embroidering-Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in automatic embroidering machines and consists in a device for transforming a certain motion of rotation in a variable motion of rotation. According to this invention the shaft, to which the certain motion is imparted, actuates at least one parallel shaft by means of one of several gears. These gears are singly to be engaged, independent from each other and adapted to change the ratio of gearing.

In the accompanying drawings Figure 1 is an elevation of an embroidering machine to which the said device is connected. Fig. 2 is a plan view of said device.

1 is a shaft to which an intermitting motion of rotation of a certain value is imparted from the shaft 2 rotating continuously at constant speed by means of a suitable cam device 41. Toothed wheels 3, 4, 5, 6 and 7 are slidably but not rotatably mounted on the shaft 1, all of them being of different diameter. Two shafts 8 and 9 are arranged parallel to the shaft 1. Toothed wheels 10, 11, 12, 13 and 14 are preferably secured to but may be slidably but not rotatably mounted on each of the shafts 8 and 9. These slidable connections between the wheels and their shafts are the well-known spline or key and keyway connection. All wheels 10 to 14 are of different diameter. Each wheel 14 of both the shafts 8 and 9 is adapted to gear with the wheel 7. Other independent singly engageable gears are formed by the wheels 13 and 6, 12 and 5, 11 and 4 and 10 and 3 respectively, the whole arrangement being adapted to change the ratio of gearing. The control is performed positively and automatically in a suitable manner by means of a jacquard apparatus. On the shaft 9 is mounted free to slide a sleeve 15, to which motion of rotation is imparted by the shaft. Two bevel wheels 16 and 17 are secured to the sleeve 15, the arrangement being such that, according to their position, one of them can engage a bevel wheel 18. The latter is fixed on a shaft 19 which is connected to the cross arms of the differential gear 35. A chain-wheel 20 is secured to one of the two bevel gears of the differential gear which are free to rotate on the shaft 19 and actuates by means of a chain 21 a chain wheel 23 fixed on the shaft 22. The shaft 22 supported by the pattern board 25 is located outside of the case 24, and carries a chain wheel 26 which is connected to the chain wheel 28 by the chain 27. The arm 29 of the cross carrying the pin 30 of the pantograph is fixed to the chain. Motions of rotation of different positive and negative values are to be obtained from the shaft 1 by the above mentioned means and can be transformed into rectilinear motions and transmitted as component motions to the pin of the pantograph and thereby to the embroidery frame. A sleeve 31 is free to slide on the shaft 8 and takes part in its rotation. Two beveled gears 32 and 33 are secured to the sleeve 31 and are adapted to singly engage the beveled wheel 34 which is connected to the chain wheel 20 by means of the differential gear. This differential gear comprises the bevel wheel $a$ to which chain wheel 20 is secured and both are loose on shaft 19. Secured to shaft 19 are two arms $b$ and $c$ perpendicular thereto, each of which has loosely mounted thereon bevel pinions $d$ and $e$ respectively, that gear with the wheel $a$ and also with a wheel $f$. Wheel $f$ is connected to wheel 34 and both are loose on shaft 19. By impelling the shafts 8 and 9 simultaneously positive and negative motions can be transmitted to the arm 29 which differ by subtraction and addition from those obtained by the shaft 8 alone.

In the method of construction illustrated on the drawing a second device with a shaft $1^a$ is used, which is identical with the above described device and which is to form the other component. The intermittent motions of rotation of a certain value are obtained from the shaft $1^a$, transformed to a variable motion of rotation, transmitted to the shaft 22ª, transformed to a variable rectilinear motion and transferred to the arm 29ª.

The movement of the toothed wheels and the sleeves can be performed in a suitable manner by positive and automatical means.

I claim:

1. In an automatic embroidering machine, the combination with the work supporting frame and means for imparting a component of movement for a stitch; of a rotatable shaft, devices for imparting unidirectional periodic rotary movement of given value to said shaft, a second shaft rotatable in one direction only, parallel to the first shaft, rotatable, selectively and independently operable motion transmitting mechanisms between said shafts for separately imparting a different ratio of transmission, said first shaft transmitting to the second shaft a rotation of a different value dependent upon the motion transmitting mechanism, and means to impart the movement of the second shaft to said means.

2. In an automatic embroidering machine, the combination with the work supporting frame and means for imparting a component of movement to said frame; of a shaft, means for imparting to said shaft rotation of definite value, a second shaft parallel to the first shaft, independent gears arranged for selective engagement for changing the ratio of gearing between the two shafts and mechanism driven from the second shaft for driving the means for imparting movement to the frame.

3. In an automatic embroidering machine, the combination with the work supporting frame and means for moving the same in accordance with one component of movement; of a shaft, means for imparting step-by-step rotation thereto, a shaft parallel thereto, and means on the shafts to operate in pairs one pair at a time, to change the ratio of transmission from the first to the second shaft, and devices for imparting the movement of the second shaft to said frame moving means.

4. In an automatic embroidering machine, the combination with the work supporting frame, and a transverse shaft arranged to impart one component of movement to said frame; of a shaft, means for imparting step-by-step rotation thereto, a shaft parallel to the last mentioned shaft, means on the last two mentioned shafts to operate in pairs one pair at a time, to change the ratio of transmission from the first parallel to the second parallel shaft, and reversible driving means connecting said transverse shaft and the parallel shafts.

5. In an automatic embroidering machine, the combination with the work supporting frame thereof and means for imparting a component of movement to said frame; of a shaft, means for imparting a step-by-step rotation to said shaft, a shaft parallel to the first mentioned shaft, elements on said shafts coöperating in pairs, and means to automatically cause the selective coöperation of pairs of elements to selectively change the speed ratio of the two shafts, and mechanism connecting said parallel shaft to the means for imparting the component of movement.

6. In an automatic embroidering machine, the combination with the work supporting frame thereof and a transverse shaft from which a component of movement for a stitch is imparted to said frame; of a shaft, means for imparting a step-by-step rotation to said shaft, a shaft parallel to the last named shaft, elements on said parallel shafts coöperating in pairs, means to automatically cause the selective coöperation of pairs of elements to selectively change the speed ratio of the parallel shafts, and reversible driving means connecting said transverse shaft and the parallel shafts.

7. In an automatic embroidering machine, the combination with the work supporting frame thereof and a transverse shaft from which a component of movement for a stitch is imparted to said frame; of a shaft, means for imparting step by step rotation thereto, two parallel shafts, elements thereon, and elements on the second mentioned shaft arranged to coöperate with the elements on the parallel shafts, automatic means to cause the selective coöperation of pairs of elements between the second mentioned shaft and the parallel shafts, a driven element on the transverse shaft, reversing mechanism between said element and one of the parallel shafts to drive the same either positively or negatively, a differential mechanism connected to said element, and reversing means coöperating with and between said differential mechanism and the second parallel shaft.

In testimony that I claim the foregoing as my invention, I have signed my name in presence of two subscribing witnesses.

KARL EGGART.

Witnesses:
  ERNST FISCHER,
  AUGUST RUEGG.

Copies of this patent may be obtained for five cents each, by addressing the "Commissioner of Patents, Washington, D. C."